(12) United States Patent
Uchida et al.

(10) Patent No.: US 7,445,148 B2
(45) Date of Patent: Nov. 4, 2008

(54) RADIO COMMUNICATION SYSTEM, READER/WRITER APPARATUS, KEY MANAGING METHOD, AND COMPUTER PROGRAM

(75) Inventors: Norio Uchida, Kanagawa (JP); Taro Kurita, Tokyo (JP); Minoru Handa, Kanagawa (JP)

(73) Assignee: Felica Networks, Inc. (JP)

( * ) Notice: Subject to any disclaimer, the term of this patent is extended or adjusted under 35 U.S.C. 154(b) by 340 days.

(21) Appl. No.: 11/341,475

(22) Filed: Jan. 30, 2006

(65) Prior Publication Data

US 2006/0181396 A1 Aug. 17, 2006

(30) Foreign Application Priority Data

Feb. 10, 2005 (JP) ............................. 2005-034852

(51) Int. Cl.
*G06K 5/451* (2006.01)
(52) U.S. Cl. .................... 235/380; 235/375; 235/382; 235/451; 235/492; 340/5.26; 340/5.61; 340/5.62; 340/5.63; 340/5.64; 380/270; 380/277; 713/169
(58) Field of Classification Search ................ 235/451, 235/492, 382, 380; 340/10.51, 10.1, 5.61–5.64, 340/5.26; 380/270–277; 713/169
See application file for complete search history.

(56) References Cited

U.S. PATENT DOCUMENTS 5,727,230 A * 3/1998 Fujioka ........................... 710/5
2003/0088777 A1* 5/2003 Bae et al. ...................... 713/181

FOREIGN PATENT DOCUMENTS

JP 2004-264921 9/2004

* cited by examiner

*Primary Examiner*—Uyen-Chau N Le
*Assistant Examiner*—Tuyen K Vo
(74) *Attorney, Agent, or Firm*—Rader Fishman & Grauer PLLC; Ronald P. Kananen

(57) ABSTRACT

A reader/writer apparatus to communicate with an external radio communication apparatus in accordance with instructions from a controller apparatus is provided. The reader/writer apparatus includes a storage unit including one or more key storing segments to store access keys that enable communication with the radio communication apparatus; an access key searching unit configured to search for an access key stored in one of the key storing segments on the basis of key-associated information that is received from the controller apparatus and that can uniquely specify the access key; and a communication unit configured to receive instructions from the controller apparatus, generate a command corresponding to the instructions, and transmit the command to the radio communication apparatus by using the access key obtained by the access key searching unit.

13 Claims, 10 Drawing Sheets

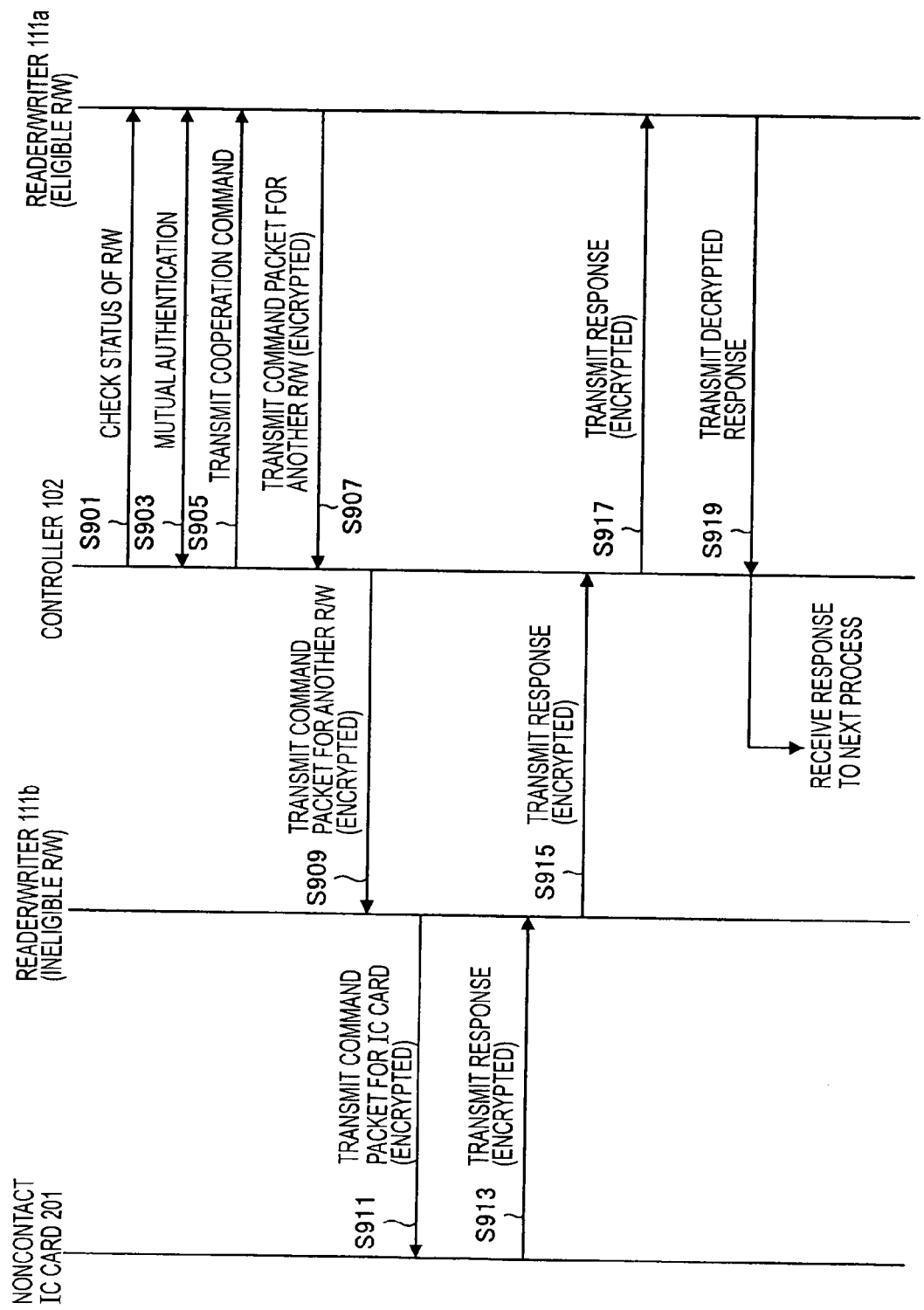

RADIO COMMUNICATION SYSTEM, READER/WRITER APPARATUS, KEY MANAGING METHOD, AND COMPUTER PROGRAM

CROSS REFERENCES TO RELATED APPLICATIONS

The present invention contains subject matter related to Japanese Patent Application JP 2005-034852 filed in the Japanese Patent Office on Feb. 10, 2005, the entire contents of which are incorporated herein by reference.

BACKGROUND OF THE INVENTION

1. Field of the Invention

The present invention relates to a radio communication system including a radio communication apparatus and a reader/writer, a reader/writer apparatus, a key managing method, and a computer program.

2. Description of the Related Art

Various cards having a settlement function, such as credit cards, cash cards, and prepaid cards to give a purchaser points in accordance with a purchased amount, are widely available in these days. The type of these cards may be a magnetic card, a contact IC (integrated circuit) card, or a noncontact IC card.

Among these types, the noncontact IC card is significant in its technological advance. The noncontact IC card is excellent in that security can be ensured and that data can be processed in short time, and thus is widely used as a radio communication apparatus capable of performing radio communication in an entrance/exit system in transportation or an in/out system in an office or the like.

Typically, a radio communication system using the radio communication apparatus includes a radio communication apparatus such as a noncontact IC card and a reader/writer (R/W) capable of reading/writing data from/on a memory provided in the radio communication apparatus.

The reader/writer connects to an information processing apparatus, such as a personal computer (PC), so as to communicate with the radio communication apparatus (transmit/receive data) on behalf of the PC that cannot directly communicate with a noncontact IC card.

Recently, demand for using a plurality of services, such as electronic settlement and in/out recording in an office, with one radio communication apparatus or noncontact IC card has been increasing. Accordingly, the capacity of a storage unit (e.g., memory) provided in a radio communication apparatus such as a noncontact IC card has become large.

On the other hand, a plurality of types of radio communication apparatuses having different interface standards, such as different security algorithms or different command systems, have emerged. For example, in noncontact IC cards, there exist two types (Type A and Type B) of proximity noncontact IC cards in ISO/IEC 14443. In this case, different noncontact IC cards are used and different readers/writers are used according to the respective types.

As a solution for the above-described problem, Patent Document 1 (Japanese Unexamined Patent Application Publication No. 2004-264921) discloses the following technique. That is, a module capable of executing processes of command systems corresponding to noncontact IC cards of different interface standards is provided in a controller apparatus, so that the controller apparatus communicates with a reader/writer by using a command that is independent of a type of noncontact IC card.

SUMMARY OF THE INVENTION

However, access keys used to access a noncontact IC card are collectively managed by the controller apparatus, which is tamper-resistant. Thus, if a plurality of services are used with one noncontact IC card, a key storing area to store the access keys becomes complicated. As a result, a path to search for each access key becomes complicated, and thus a processing load put on the controller apparatus increases disadvantageously.

In order to prevent leakage of access keys to access a noncontact IC card, the access keys are periodically changed. In a typical process of changing an access key, a reader/writer obtains the access key to be changed from a controller apparatus and tries to access a noncontact IC card. Then, if it is determined that the access key needs to be changed, the reader/writer requests change information used to change the access key to the controller apparatus.

If such data transmission/reception is performed many times between the reader/writer and the controller apparatus, read/write of data is not performed at high speed between the reader/writer and a noncontact IC card. As a result, much time is required in electronic settlement or the like disadvantageously.

Further, the existing reader/writer may be impossible to be used as it is, but a new reader/writer needs to be purchased and installed. This causes extra expense on the service provider side.

The present invention has been made in view of the above-described problems and is directed to provide a new and improved radio communication system, reader/writer apparatus, key managing method, and computer program in which the reader/writer apparatus is capable of managing access keys that are required for communication with a radio communication apparatus such as a noncontact IC card, for example, capable of storing, searching for, or changing the access keys.

According to an embodiment of the present invention, there is provided a reader/writer apparatus to communicate with an external radio communication apparatus in accordance with instructions from a controller apparatus. The reader/writer apparatus includes: a storage unit including one or more key storing segments to store access keys that enable communication with the radio communication apparatus; an access key searching unit configured to search for an access key stored in one of the key storing segments on the basis of key-associated information that is received from the controller apparatus and that can uniquely specify the access key; and a communication unit configured to receive instructions from the controller apparatus, generate a command corresponding to the instructions, and transmit the command to the radio communication apparatus by using the access key obtained by the access key searching unit.

If the controller apparatus transmits key-associated information used to search for an access key to the reader/writer apparatus, the reader/writer apparatus searches for and obtains the access key. With this configuration, management of the access keys can be entrusted to the reader/writer apparatus, so that a processing load caused by searching or the like imposed on the controller apparatus side (including an upper application or the like) can be reduced. The access key may be either an asymmetric key or a symmetric key.

The key-associated information may include at least one of the name of the key storing segment where the access key is stored, the version of the access key, and the name of the access key. With this configuration, an access key can be searched for simply by specifying key-associated information (e.g., three items) indicating a relative position of the access key, without specifying a storage address of the key storing segment indicating an absolute position of the access key.

The storage unit may further include one or more change information storing segments to store key change information used to change the access keys. The key change information may be associated with the access keys in a one-on-one or one-to-many relationship.

The reader/writer apparatus may further include a key change information searching unit configured to search for key change information on the basis of key-change-associated information that is received from the controller apparatus and that can uniquely specify the key change information stored in one of the change information storing segments. With this configuration, the reader/writer apparatus manages the key change information to change the access keys, so that a load of searching for key change information imposed on the controller apparatus side (including an upper application or the like) can be reduced.

The key-change-associated information may include at least one of the name of the change information storing segment where the key change information is stored, the version of the key change information, and the name of the key change information. With this configuration, search can be easily performed by using the key-change-associated information without directly specifying a storage address indicating an absolute position.

One or more types of instructions transmitted from the controller apparatus may include an erasing instruction to erase all of the access keys and/or the key change information held in the reader/writer apparatus. The reader/writer apparatus may include an information erasing unit configured to erase the information stored in the key storing-segments and/or the change information storing segments of the storage unit in accordance with the erasing instruction received from the controller apparatus. With this configuration, when the reader/writer apparatus is to be abandoned, for example, secret information such as the access keys managed by the reader/writer apparatus can be securely erased, so that the risk of leakage of the secret information such as the access keys can be minimized.

The process by the access key searching unit may be executed when searching for an access key is entrusted by the controller apparatus. With this configuration, independency of the process performed by the access key searching unit can be enhanced and the security level increases.

The process by the key change information searching unit may be executed when searching for key change information is entrusted by the controller apparatus. With this configuration, independency of the process performed by the key change information searching unit can be enhanced and the security level increases.

The radio communication apparatus may be a noncontact IC card.

According to another embodiment of the present invention, there is provided a radio communication system including a plurality of radio communication apparatuses; a plurality of reader/writer apparatuses to communicate with the radio communication apparatuses; and a controller apparatus to control a communication process performed by the reader/writer apparatuses. In the radio communication system, the controller apparatus includes a communication instructions receiving unit configured to at least receive instructions (including change of access keys) about communication between the radio communication apparatuses and the reader/writer apparatuses from an upper application or the like; and a communication requesting unit configured to request the reader/writer apparatuses to perform communication in accordance with the instructions received by the communication instructions receiving unit. Each of the reader/writer apparatuses includes a storage unit including one or more key storing segments to store access keys that enable communication with the radio communication apparatus as a communication partner; an access key searching unit configured to search for an access key stored in one of the key storing segments on the basis of key-associated information that is included in instructions received from the controller apparatus and that can uniquely specify the access key; and a communication unit configured to receive instructions from the controller apparatus, generate a command corresponding to the instructions in order to communicate with the radio communication apparatus, and transmit the command to the radio communication apparatus by using the access key obtained by the access key searching unit. The communication instructions receiving unit receives instructions to perform communication between at least one radio communication apparatus selected from among the plurality of radio communication apparatuses and an eligible reader/writer apparatus capable of communicating with the selected radio communication apparatus. If the selected radio communication apparatus exists in a communication area of an ineligible reader/writer apparatus whose command system is different from that of the selected radio communication apparatus, the communication requesting unit requests the eligible reader/writer apparatus to generate a proxy command corresponding to the received instructions so that the ineligible reader/writer apparatus can perform communication on behalf of the eligible reader/writer apparatus. The communication unit provided in the eligible reader/writer apparatus generates a command adapted to the command system of the eligible reader/writer apparatus as the proxy command in response to the request from the communication requesting unit. The access key searching unit provided in the eligible reader/writer apparatus searches for an access key on the basis of the key-associated information included in the request from the communication requesting unit. The controller apparatus generates common information including the access key obtained by the eligible reader/writer apparatus and the proxy command and transmits the common information to the ineligible reader/writer apparatus. The ineligible reader/writer apparatus receives the common information, extracts the proxy command and the access key included in the common information, and transmits the proxy command to the selected radio communication apparatus by using the access key on behalf of the eligible reader/writer apparatus. The communication protocol of the radio communication and the reader/writer apparatus are resolved by software or the like.

In the radio communication system, the plurality of reader/writer apparatuses are connected to the controller apparatus. Firstly, since access keys are managed by each reader/writer apparatus, the reader/writer apparatus searches for and obtains an access key if the controller apparatus transmits key-associated information used for search to the reader/writer apparatus. With this configuration, a processing load caused by search and so on imposed on the controller apparatus side (including an upper application or the like) can be reduced. Secondly, even an ineligible reader/writer apparatus having a different command system from that of the radio communication apparatus can communicate with the radio communication apparatus if the controller apparatus requests an eligible reader/writer apparatus having the same command system as that of the radio communication apparatus to generate a proxy command that enables the ineligible reader/ writer apparatus to communicate with the radio communication apparatus. With this configuration, even if a function of enabling communication with a radio communication apparatus of different command system is not added to the reader/writer apparatus, the reader/writer apparatus can communicate with the radio communication apparatus.

The communication unit provided in the eligible reader/writer apparatus may encrypt the access key and/or the proxy command with a pair key or a common key that is effective between the controller apparatus and the eligible reader/writer apparatus. With this configuration, the security level can be increased, so that decrypting data becomes difficult even if the data is tapped.

An encrypted response from the selected radio communication apparatus as a communication partner may be transmitted to the eligible reader/writer apparatus via the ineligible reader/writer apparatus and the controller apparatus and decrypted by the eligible reader/writer apparatus.

According to another embodiment of the present invention, there is provided a key managing method for a reader/writer apparatus communicating with an external radio communication apparatus in accordance with instructions from a controller apparatus. The key managing method includes the steps of: searching for an access key among access keys that are stored in one or more key storing segments of a storage unit and that enable communication with the radio communication apparatus on the basis of key-associated information that is received from the controller apparatus and that can uniquely specify the access key; and receiving instructions from the controller apparatus, generating a command corresponding to the instructions, and transmitting the command to the radio communication apparatus by using the access key obtained in the access key searching step.

According to another embodiment of the present invention, there is provided a computer program to allow a computer to function as a reader/writer apparatus communicating with an external radio communication apparatus in accordance with instructions from a controller apparatus. The computer program includes access key searching means for searching for an access key among access keys that are stored in one or more key storing segments of a storage unit and that enable communication with the radio communication apparatus on the basis of key-associated information that is received from the controller apparatus and that can uniquely specify the access key; and transmission means for receiving instructions from the controller apparatus, generating a command corresponding to the instructions, and transmitting the command to the radio communication apparatus by using the access key obtained by the access key searching means.

The access key searching means may be executed when an access key searching process is entrusted by the controller apparatus. When the searching process is entrusted by the controller apparatus, an access right of the controller apparatus can be separated and the independency of the searching process by the access key searching means can be enhanced, so that the security level increases. If the program is constituted with an object orientation, a new module can be easily incorporated thereto and the development cost can be reduced.

The key change information searching means may be executed when a key change information searching process is entrusted by the controller apparatus. When the searching process is entrusted by the controller apparatus, an access right of the controller apparatus can be separated and the independency of the searching process by the key change information searching means can be enhanced, so that the security level increases.

As described above, according to the embodiments of the present invention, the reader/writer apparatus can manage access keys that enable communication with a radio communication apparatus. Therefore, communication with the radio communication apparatus can be quickly and securely performed even if the number of services and access keys increases.

BRIEF DESCRIPTION OF THE DRAWINGS

FIG. 10 is a sequence diagram showing a process performed in the radio communication system according to the second embodiment.

DESCRIPTION OF THE PREFERRED EMBODIMENTS

Figure 1:
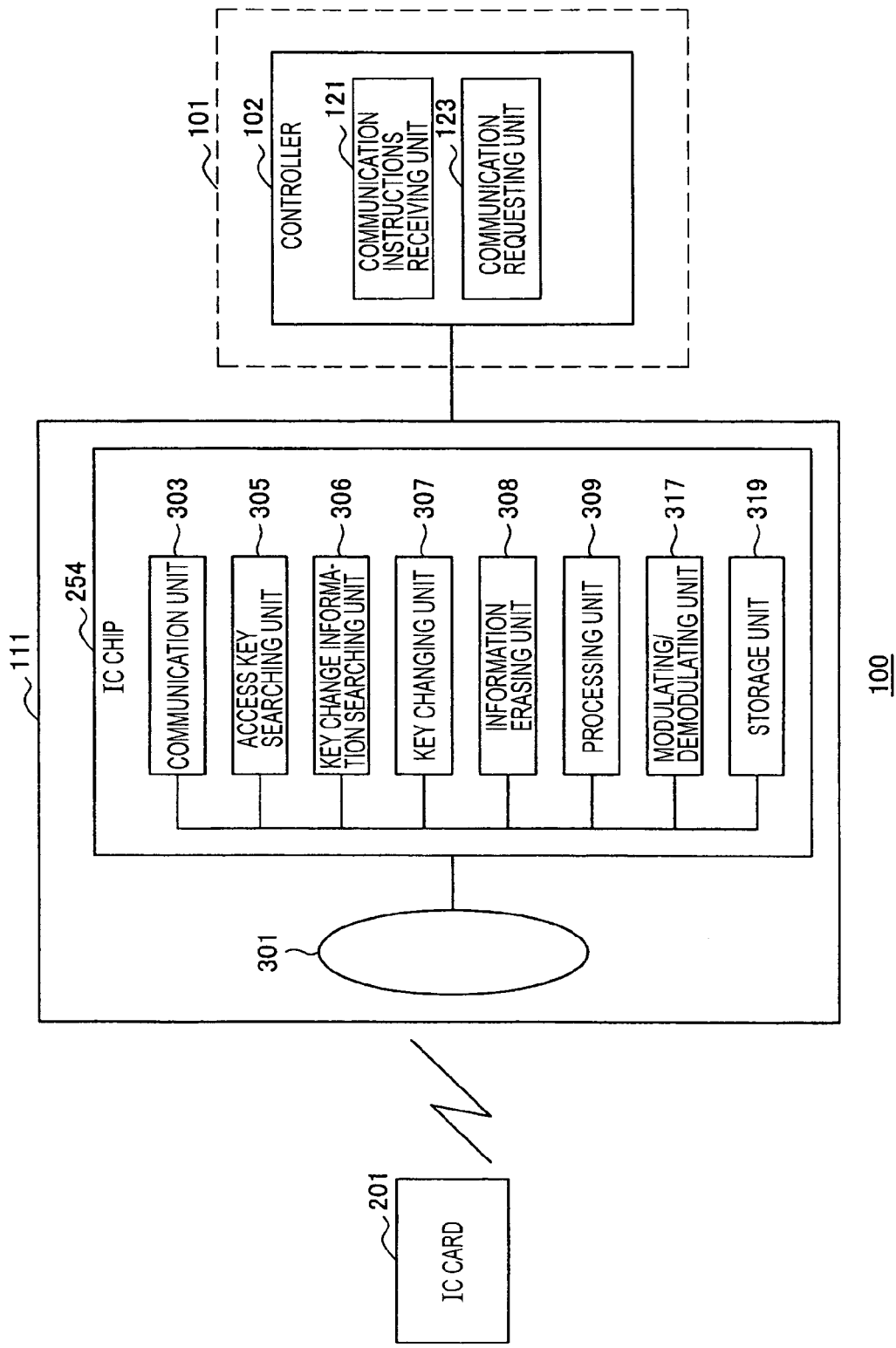
FIG. 1 is a block diagram showing the configuration of a radio communication system according to a first embodiment of the present invention.

Hereinafter, embodiments of the present invention are described in detail with reference to the attached drawings. In the following description and attached drawings, elements having substantially the same function and configuration are denoted by the same reference numerals and a duplicate description is omitted.

First Embodiment: One Reader/Writer 111

First, a radio communication system 100 according to a first embodiment is described with reference to FIG. 1. FIG. 1 is a block diagram showing the configuration of the radio communication system 100 according to the first embodiment.

As shown in FIG. 1, the radio communication system 100 includes at least an information processing apparatus 101, a reader/writer (or reader/writer apparatus) 111, and a noncontact IC card 201.

The information processing apparatus 101 entrusts accessing the noncontact IC card 201 to the reader/writer 111 so as to read data stored in the noncontact IC card 201 or to write data thereon.

In this specification, "access" means information processing, such as referring to (or reading) data held in the noncontact IC card 201, storing data (or writing data), deleting data, updating data (or writing data), or the like.

The information processing apparatus 101 shown in FIG. 1 is a computer apparatus, such as a personal computer (PC), of either a notebook type or a desktop type.

The information processing apparatus 101 includes a controller 102; a storage unit capable of storing data, such as a hard disk drive or a RAM (random access memory); an input unit, such as a mouse and a keyboard; an output unit to display images and characters on a screen, and a CPU (central processing unit) or the like.

The storage unit of the information processing apparatus 101 stores an installed application (or software), and the controller 102 receives various instructions from the application. The controller 102 according to this embodiment is tamper-resistant, but is not limited to a specific one as long as the security can be ensured.

The information processing apparatus 101 according to this embodiment is a computer apparatus, but is not limited the computer apparatus as long as it can access the noncontact IC card 201 via the reader/writer 111. For example, the information processing apparatus 101 may be a PDA (personal digital assistant), an image pickup apparatus such as a digital camera or a video recorder, a home use game machine, a VTR (video tape recorder), a CD/DVD recorder/player, a radio, a portable phone, a PHS (personal handyphone system), a television set, or a home information appliance.

When a user puts the noncontact IC card 201 over the reader/writer 111, the information processing apparatus 101 can transmit/receive data to/from the noncontact IC card 201. The reader/writer 111 includes a noncontact IC chip 254 capable of performing radio communication. The details thereof will be described below.

The reader/writer 111 receives instructions from the controller 102, transmits a predetermined command to the noncontact IC card 201, and performs radio communication therewith, e.g., writes data. The radio communication is performed by using an access key held by the reader/writer 111 so that the security can be ensured. The details thereof will be described below.

In this specification, an upper application or the controller 102 outputs instructions, whereas the reader/writer 111 outputs commands to the noncontact IC card 201. However, the present invention is not limited to this, but the controller 102 may output commands.

The reader/writer 111 provided in the radio communication system 100 according to this embodiment is separated from the information processing apparatus 101. However, the present invention is not limited to this configuration, but the reader/writer 111 may be incorporated into the information processing apparatus 101.

The noncontact IC card 201 includes a noncontact IC chip (not shown). The noncontact IC chip is a device that includes an RF (radio frequency) antenna or the like and that is capable of performing radio communication. When the noncontact IC chip is brought into a communicatable area of the reader/writer 111 (e.g., within 20 cm from the reader/writer 111), the noncontact IC chip can perform radio communication with the reader/writer 111 after a predetermined process, such as identifying the reader/writer 111 as a communication partner by polling.

(Controller 102)

As shown in FIG. 1, the information processing apparatus 101 includes the controller 102. The controller 102 controls communication processes performed between the reader/writer 111 and the noncontact IC card 201. For example, the controller 102 provides instructions about communication with the noncontact IC card 201 to the reader/writer 111.

As shown in FIG. 1, the controller 102 includes a communication instructions receiving unit 121 and a communication requesting unit 123. The communication instructions receiving unit 121 receives communication instructions from the upper application that is installed into the information processing apparatus 101. The communication instructions are particularly about communication performed between the reader/writer 111 and the noncontact IC card 201. However, the present invention is not limited to this example. The communication instructions receiving unit 121 may perform protocol conversion on the instructions received from the upper application as necessary.

(Reader/Writer 111)

As shown in FIG. 1, the reader/writer 111 includes the noncontact IC chip 254 and an antenna 301 to transmit/receive radio waves to/from the noncontact IC card 201. The noncontact IC chip 254 according to this embodiment is tamper-resistant, but is not limited to a specific one as long as the security can be ensured.

The noncontact IC chip 254 includes a communication unit 303, an access key searching unit 305, a key change information searching unit 306, a key changing unit 307, an information erasing unit 308, a processing unit 309, a modulating/demodulating unit 317, and a storage unit 319. In this specification, a unit composed of the antenna 301, the communication unit 303, and the modulating/demodulating unit 317 may be called a communication unit in a broad sense.

The communication unit 303 generates commands corresponding to the instructions from the controller 102. Also, the communication unit 303 performs encoding/decoding and encrypting/decrypting as necessary.

Each of the generated commands is encoded by the communication unit 303, is modulated by the modulating/demodulating unit 317, and is transmitted to the noncontact IC card 201 via the antenna 301. The command may include data to be written in a storage area of the noncontact IC card 201 and an address (storage address) indicating a place where the data is to be written.

The communication unit 303 may transmit a generated command after encrypting it by using a synthetic key (or access key) stored in the storage unit 319 in order to ensure the security of a communication path between the reader/writer 111 and the noncontact IC card 201. The synthetic key is described in detail below.

In the radio communication system 100 according to this embodiment, a synthetic key is used as an access key enabling communication between the reader/writer 111 and the noncontact IC card 201. However, the access key is not limited to the synthetic key. For example, a single key may be used as an access key.

The access key searching unit (or synthetic key searching unit) 305 obtains associated information (key-associated information) which is included in instructions from the controller 102 and with which a synthetic key can be uniquely specified, and searches for the synthetic key on the basis of the key-associated information.

The key change information (key change package information) searching unit 306 obtains associated information (key-change-associated information) which is included in the instructions from the controller 102 and with which information (key change package information) to change a synthetic key can be uniquely specified, and searches for the key change package information on the basis of the key-change-associated information.

Since each piece of the key change package information is associated with a synthetic key, the key change information searching unit 306 may obtain a piece of key change package information associated with a synthetic key after the access key searching unit 305 has found the synthetic key.

The key changing unit 307 changes an old synthetic key to a new synthetic key on the basis of the key change package information. The frequency of changing to a new synthetic key can be freely set by using the radio communication system 100 in accordance with a service providing company or a user, for example, every other minute.

If the instructions from the controller 102 include an erasing instruction to erase all of the synthetic keys and/or key change package information stored in the reader/writer 111, the information erasing unit 308 erases all of the information in response to the instruction.

The processing unit 309 controls processing in each unit so that communication with the noncontact IC card 201 can be smoothly performed and converts the instructions from the controller 102 into signals of a format that can be processed by each unit.

As will be described below, the storage unit 319 includes a synthetic key storing area (key storing area) composed of one or more segments and a key change package storing area (key change information storing area) composed of one or more segments. These storing areas can hold data. Also, data can be deleted therefrom as necessary.

(Storing Area)

Figure 2:
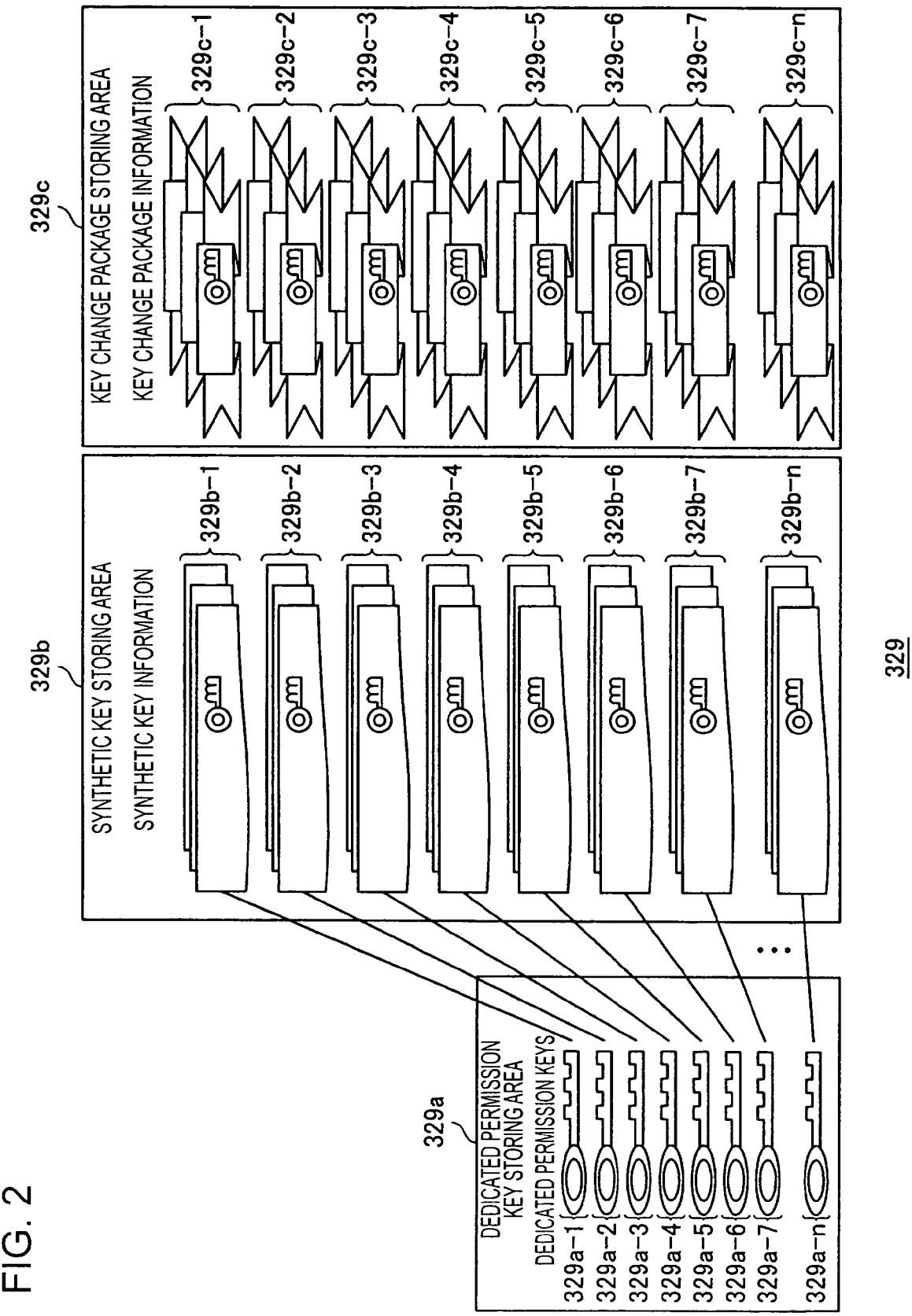
FIG. 2 illustrates a schematic configuration of a storing area according to the first embodiment.

The storing area according to the first embodiment is described with reference to FIG. 2. FIG. 2 illustrates a schematic configuration of the storing area according to the first embodiment.

As shown in FIG. 2, three types of storing areas: a dedicated permission key storing area 329a; a synthetic key storing area 329b; and a key change package storing area 329c, are assigned to a storing area 329 of the storage unit 319 in the reader/writer 111.

The dedicated permission key storing area 329a includes a plurality of dedicated permission key storing segments 329a-1, 329a-2, . . . and 329a-n. However, the present invention is not limited to this configuration but the dedicated permission key storing area 329a may be composed of a single segment.

Each of the dedicated permission key storing segments 329a-1 to 329a-n stores a dedicated permission key. Each of the dedicated permission keys stored in the dedicated permission key storing area 329a is attached with associated information, such as the name and version of the key.

The synthetic key storing area 329b includes a plurality of synthetic key storing segments 329b-1, 329b-2, . . . and 329b-n. However, the present invention is not limited to this configuration but the synthetic key storing area 329b may be composed of a single segment.

Each of the synthetic key storing segments 329b-1 to 329b-n stores one or more synthetic keys. Each of the synthetic keys stored in the synthetic-key storing area 329b is attached with associated information, such as the name and version of the key.

Through the mutual authentication between the controller 102 and the reader/writer 111 using the dedicated permission key, the controller 102 can obtain a right to use a synthetic key. Accordingly, the controller 102 can actually use one or more synthetic keys stored in the synthetic key storing area 329b of the reader/writer 111. For example, if the mutual authentication is performed by using the dedicated permission key stored in the dedicated permission key storing segment 329a-1, all of the one or more synthetic keys stored in the synthetic key storing segment 329b-1 can be used.

Different dedicated permission keys are used for respective service providers. For example, a dedicated permission key A is used for a provider A, and a dedicated permission key B is used for a provider B. Examples of a provided service include a service of giving points in accordance with a purchased amount and a service of making a payment for goods with electronic money.

The key change package storing area 329c includes a plurality of key change package storing segments 329c-1, 329c-2, . . . and 329c-n. However, the present invention is not limited to this configuration but the key change package storing area 329c may be composed of a segment.

Each of the key change package storing segments 329c-1 to 329c-n stores one or more pieces of key change package information. The one or more pieces of key change package information stored in the key change package'storing area 329c link to the synthetic keys with a ratio of 1:N or 1:1 (key change package information:synthetic key).

Each piece of the key change package information stored in the key change package storing area 329c is attached with associated information, such as the name and version of the key change package information.

In the radio communication system 100 according to this embodiment, the synthetic key is used as an access key. However, the access key is not limited to the synthetic key, but any keys other than the synthetic key may be used as an access key.

In the known art, the synthetic keys and key change package information are stored on the information processing apparatus 101 side provided with the controller 102 in most cases. Therefore, performing quick and efficient communication with the noncontact IC card 201 becomes more difficult as the range of service variations becomes wider and as the number of synthetic keys increases.

(Key-Associated Information)

Hereinafter, key-associated information according to the first embodiment is described with reference to FIGS. 3A and 3B. FIGS. 3A and 3B illustrate schematic configurations of the key-associated information according to the first embodiment.

A synthetic key stored in the synthetic key storing area 329b of the reader/writer 111 is required to communicate with the noncontact IC card 201. The key-associated information specifies the synthetic key stored in the synthetic key storing area 329b.

As described above, the key-associated information is information to uniquely specify a synthetic key and includes at least one of the name of a segment storing the synthetic key, the name of the synthetic key, and the version of the synthetic key.

As shown in FIG. 3A, after mutual authentication between the controller 102 and the reader/writer 111 using a dedicated permission key has been done, the controller 102 transmits key-associated information 401a to the reader/writer 111, so that a necessary synthetic key can be specified in the plurality of synthetic key storing segments 329b-1 to 329b-n.

The key-associated information 401a and 401b shown in FIGS. 3A and 3B include "Segment" (the name of the synthetic key storing segment) specifying the synthetic key storing segment and "Key" indicating the name of the synthetic key.

As shown in FIG. 3A, the key-associated information 401a transmitted from the controller 102 includes associated information indicating that the name of the synthetic key storing segment is "synthetic key storing segment 329b-1" and that the name of the synthetic key is "A".

On the other hand, since a synthetic key whose name is "A" is stored in the synthetic key storing segment 329b-1 of the reader/writer 111, the reader/writer 111 can specify the necessary synthetic key by referring to the key-associated information 401*a*.

Likewise, as shown in FIG. 3B, the key-associated information 401*b* transmitted from the controller 102 includes associated information indicating that the name of the synthetic key storing segment is "synthetic key storing segment 329*b*-3" and that the name of the synthetic key is "B".

The associated information, such as key-associated information and key-change-associated information, is different from an address (storage address) indicating the position where information is stored in the storing area. The associated information is not information that indicates an absolute position (or absolute path) of the storing area, such as a storage address which is likely to be composed of a long bit string, but is information that indicates a relative position (or relative path) where information is stored in the storing area.

If storage addresses are used, a vast number of storage addresses need to be managed in a table or the like because respective pieces of information are specified by the storage addresses. In contrast, the amount of associated information is significantly smaller than that of the storage addresses if the names of storing areas and synthetic keys are uniquely abbreviated.

In the known art, only a storage address is used as information to search for an access key. Furthermore, the reader/writer 111 does not search for an access key, but the controller 102 searches for an access key in accordance with instructions from an upper application of the controller 102.

(Searching for a Synthetic Key)

Figure 4:
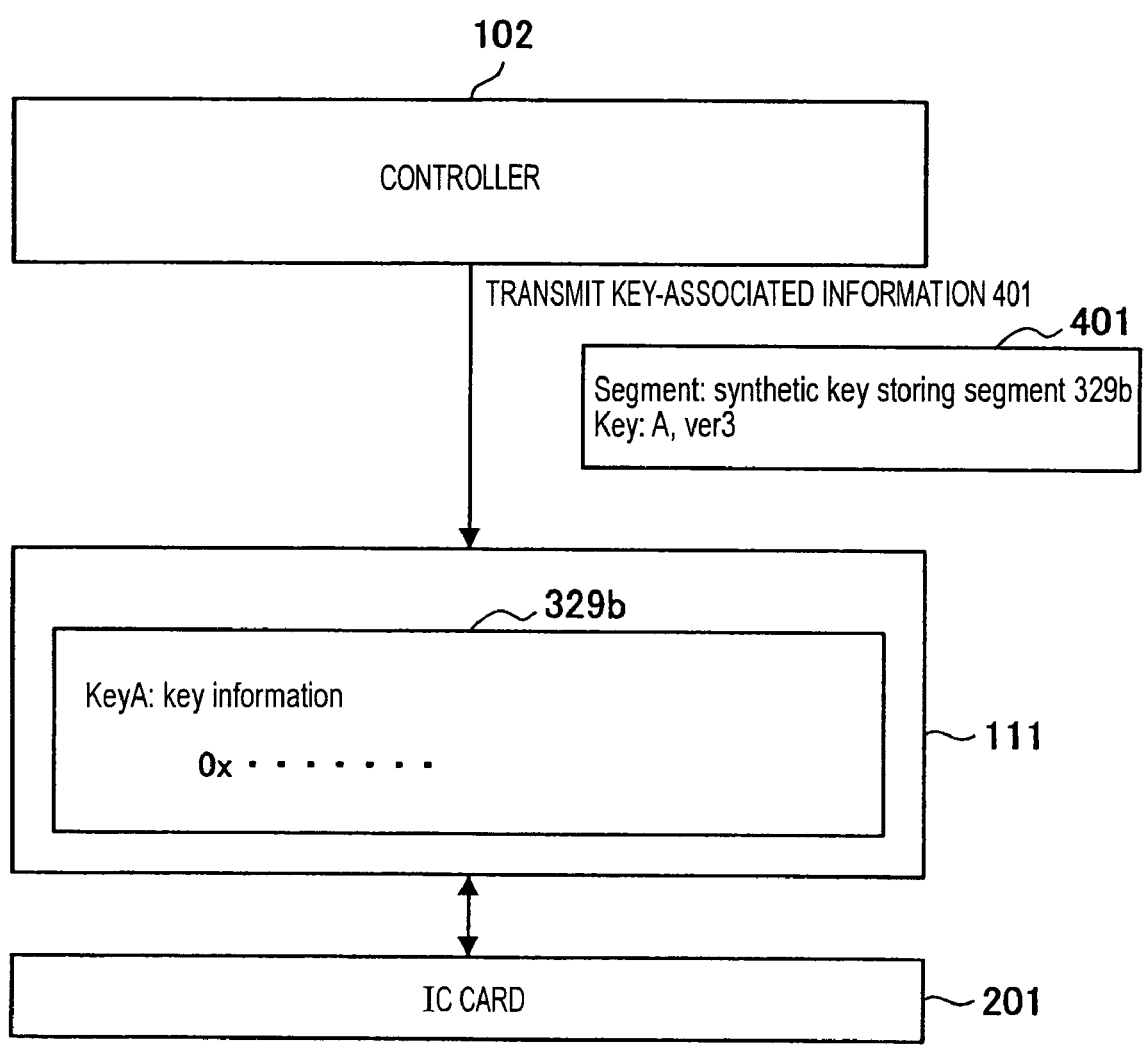
FIG. 4 illustrates a process of searching for a synthetic key according to the first embodiment.

Next, searching for a synthetic key according to the first embodiment is described with reference to FIG. 4. FIG. 4 schematically illustrates a process of searching for a synthetic key according to the first embodiment.

As shown in FIG. 4, the reader/writer 111 needs to receive key-associated information 401 from the controller 102 in order to search for a synthetic key. The key-associated information 401 is generated by the controller 102 on the basis of information transferred from the upper application (software), for example.

After the reader/writer 111 has received the key-associated information 401, the access key searching unit 305 provided in the reader/writer 111 searches the synthetic key storing area 329*b* for a synthetic key corresponding to the key-associated information 401.

Figure 3:
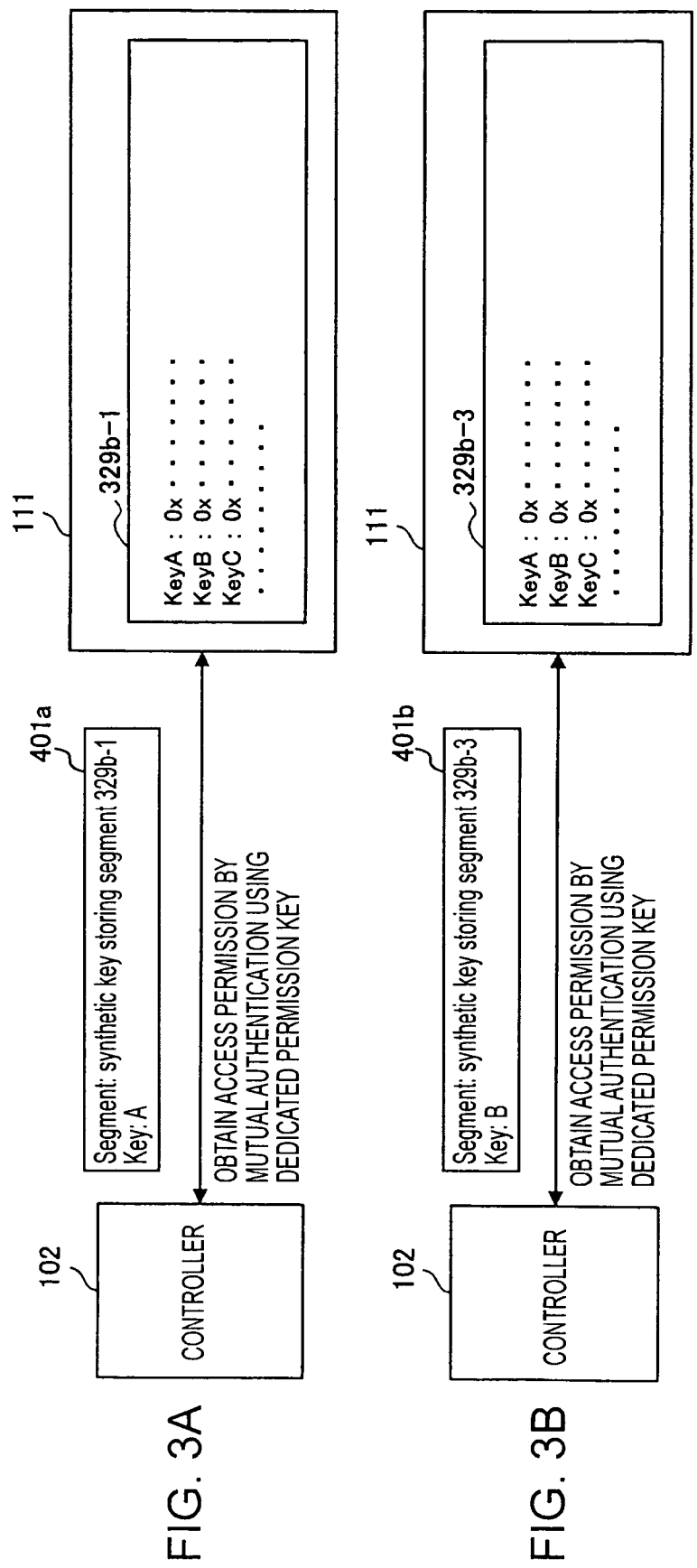
FIGS. 3A and 3B illustrate schematic configurations of key-associated information according to the first embodiment.

The key-associated information 401 shown in FIG. 4 includes the name of synthetic key storing segment and the name of synthetic key shown in FIG. 3. In addition, the key-associated information 401 includes the version of synthetic key "ver". The version shown in FIG. 4 is "3".

If the access key searching unit 305 obtains the necessary synthetic key through the search, the reader/writer 111 can communicate with the noncontact IC card 201 by using the synthetic key.

Figure 5:
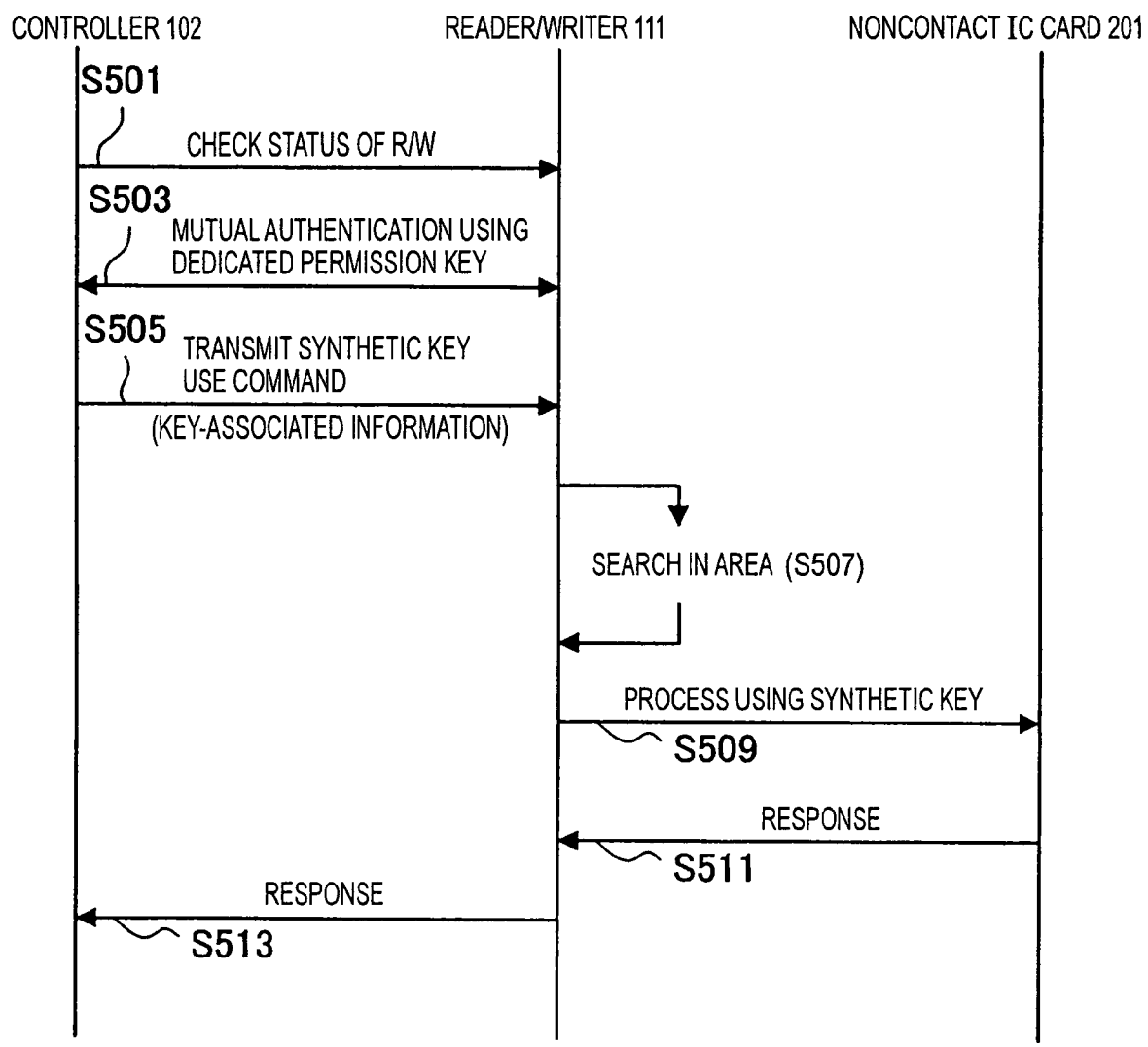
FIG. 5 is a sequence diagram showing a process of searching for a synthetic key according to the first embodiment.

Hereinafter, the process of searching for a synthetic key according to the first embodiment is further described with reference to FIG. 5. FIG. 5 is a sequence diagram schematically showing the process of searching for a synthetic key according to the first embodiment.

As shown in FIG. 5, the controller 102 receives instructions to access the noncontact IC card 201 from the upper application and checks the status of the reader/writer 111, that is, determines whether the reader/writer 111 to communicate with the target noncontact IC card 201 normally operates (S501).

Then, the controller 102 performs mutual authentication with the reader/writer 111 by using a dedicated permission key corresponding to a service or the like described in the instructions (S503). The dedicated permission key used in the mutual authentication is specified by the upper application. The specification is made by using, for example, a service name or an ID to identify the noncontact IC card.

After the mutual authentication has been done (S503), the controller 102 transmits a synthetic key use command describing the content of communication using a synthetic key between the reader/writer 111 and the noncontact IC card 201. The synthetic key use command includes key-associated information and data to be stored in the noncontact IC card 201.

After transmitting the synthetic key use command, the controller 102 entrusts all of the subsequent processes to the reader/writer 111 until receiving a response. Therefore, the controller 102 cannot obtain a synthetic key found by the reader/writer 111 or refer to the content of the synthetic key.

The data transmitted between the controller 102 and the reader/writer 111 is encrypted by pair keys (public key and secret key) or a common key so that the security can be ensured.

The reader/writer 111 extracts key-associated information included in the synthetic key use command and searches the synthetic key storing area 329*b* for the corresponding key on the basis of the key-associated information (S507).

After the search (S507), the reader/writer 111 obtains the synthetic key, generates a command described in the synthetic key use command, transmits the command to the noncontact IC card 201 by using the synthetic key, and allows the noncontact IC card 201 to execute the command and to perform the requested process (S509). For example, the command transmitted from the reader/writer 111 can allow the noncontact IC card 201 to perform a plurality of processes, such as updating the points stored in the noncontact IC card 201 and reducing the balance of electronic money.

Then, the noncontact IC card 201 transmits a response indicating a process execution result to the reader/writer 111 (S511). If the response is encrypted, the reader/writer 111 appropriately decrypts the response, encrypts the response again, and transmits the response to the controller 102 (S513).

The controller 102 receives the response from the reader/writer 111 (S513), transmits the communication result to the upper application, and waits for next instructions. The upper application can determine whether the communication between the reader/writer 111 and the noncontact IC card 201 has been successfully done or not by receiving the communication result, and thus can provide next instructions.

(Key-Change-Associated Information)

Figure 6:
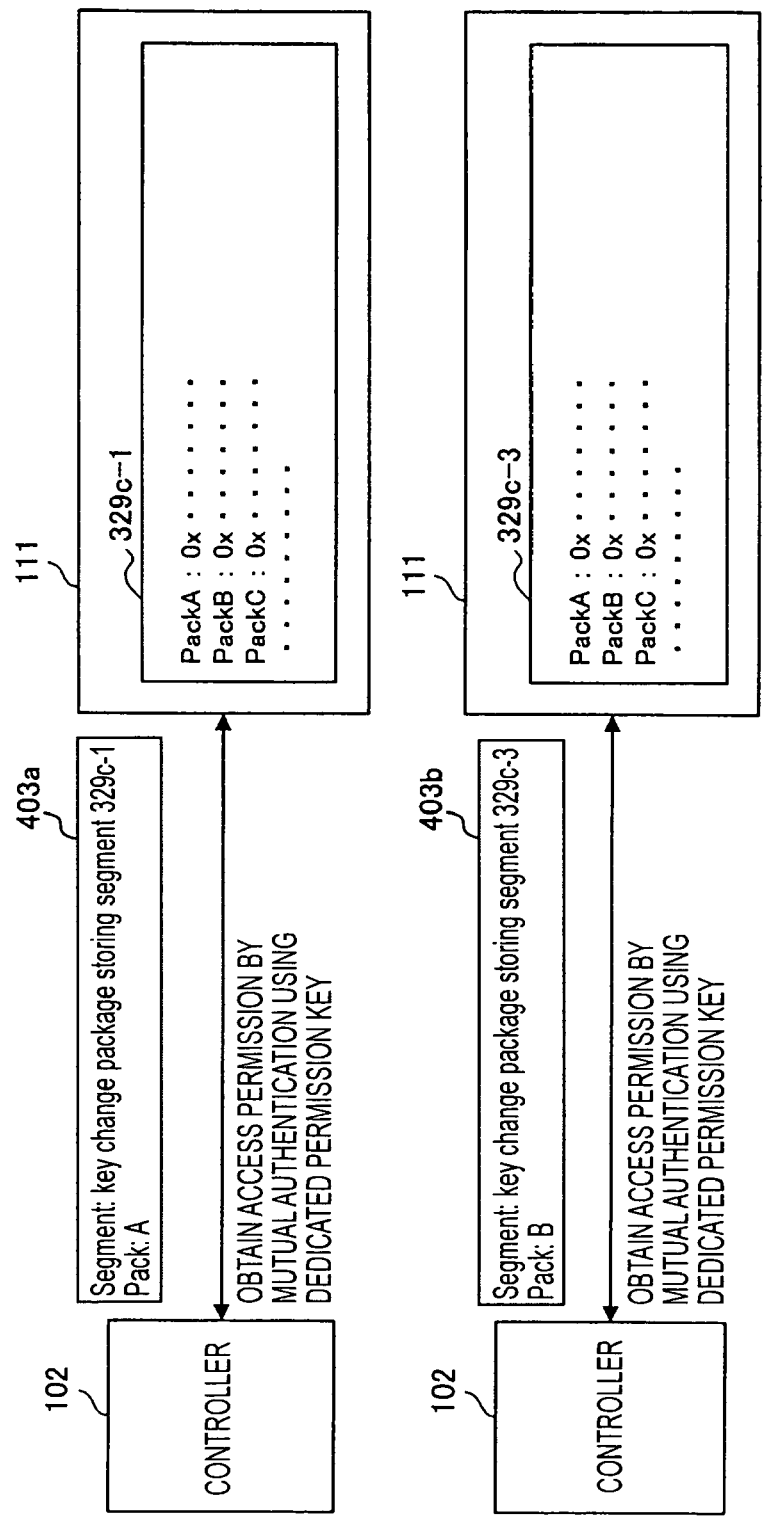
FIGS. 6A and 6B illustrate schematic configurations of key-change-associated information according to the first embodiment.

Next, the key-change-associated information according to the first embodiment is described with reference to FIGS. 6A and 6B. FIGS. 6A and 6B illustrate schematic configurations of the key-change-associated information according to the first embodiment.

An access key (synthetic key) is required to access the noncontact IC card 201. However, if the synthetic key leaks, secret information may be tapped or tampered. Therefore, in order to prevent leakage of the synthetic key, the synthetic key is changed after a predetermined period has elapsed.

In order to change an old synthetic key to a new synthetic key at predetermined intervals, key change package information (key change information) describing the information about the new synthetic key is necessary. Key-change-associated information specifies the key change package information stored in the key change package storing area 329*c*.

As described above, the key-change-associated information is information to uniquely specify key change package information and includes at least one of the name of key change package storing segment that stores the key change package information, the name of the key change package information, and the version of the key change package information.

Although the key is changed at predetermined intervals, whether the key needs to be changed is determined by the controller 102. For example, if access to the noncontact IC card 201 has failed and if the controller 102 obtains a response (error) from the noncontact IC card 201, the controller 102 determines that the key needs to be changed. In the known art, information required to change a key is not managed by the reader/writer 111, but is managed by an upper application. Further, the information required to change the key is distributed from the controller 102 to the noncontact IC card 201 via the reader/writer 111.

As shown in FIG. 6A, after mutual authentication using a dedicated permission key has been done between the controller 102 and the reader/writer 111, the controller 102 transmits key-change-associated information 403a to the reader/writer 111. Accordingly, the necessary key change package information can be specified in the plurality of key change package storing segments 329c-1 to 329c-n.

The key-change-associated information 403a and 403b shown in FIGS. 6A and 6B include "Segment" (the name of the key change package storing segment) specifying the key change package storing segment and "Pack" indicating the name of the key change package information.

As shown in FIG. 6A, the key-change-associated information 403a transmitted from the controller 102 includes associated information indicating that the name of the key change package storing segment is "key change package storing segment 329c-1" and that the name of the key change package information is "A".

On the other hand, the key change package storing segment 329c-1 in the reader/writer 111 stores key change package information whose name is "A". Therefore, the reader/writer 111 can specify the necessary key change package information by referring to the key-change-associated information 403a.

Likewise, as shown in FIG. 6B, the key-change-associated information 403b transmitted from the controller 102 includes associated information indicating that the name of the key change package storing segment is "key change package storing segment 329c-3" and that the name of the key change package information is "B".

As the above-described key-associated information, associated information such as the key-change-associated information is different from an address (storage address) indicating the position where information is stored in a storing area. The associated information is not information that indicates an absolute position (or absolute path) of a storing area, such as a storage address having a long bit string, but is information that indicates a relative position (or relative path) where necessary information is stored (associated information that is capable of uniquely specifying necessary information and that has a smaller information amount than storage addresses).

A process of searching for key change package information on the basis of key-change-associated information is substantially the same as the process of searching for a synthetic key according to the first embodiment, except that key-change-associated information is used instead of key-associated information. Thus, the detailed description thereof is omitted.

(A Process of Abandoning Synthetic Keys and So On)

Figure 7:
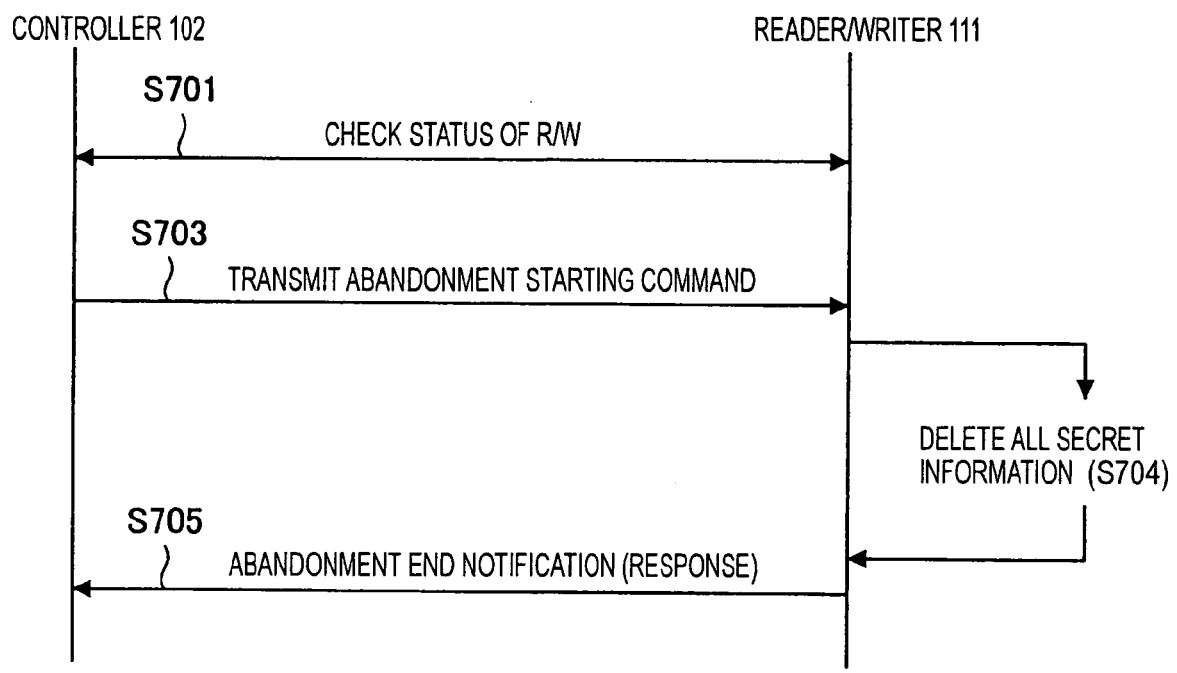
FIG. 7 is a sequence diagram showing an example of an abandoning process according to the first embodiment.

Next, a process of abandoning (erasing) synthetic keys or key change package information according to the first embodiment is described with reference to FIG. 7. FIG. 7 is a sequence diagram showing an example of the abandoning process according to the first embodiment.

As described above, in the radio communication system 100 according to this embodiment, synthetic keys enabling access to the noncontact IC card 201 are mainly stored and managed (changed or deleted) by the reader/writer 111.

Therefore, if the reader/writer 111 is replaced by another one for some reasons, various information including synthetic keys stored in the storing area of the storage unit 319 of the reader/writer 111 needs to be erased and abandoned.

As shown in FIG. 7, after receiving instructions to erase secret information from the upper application or the like, the controller 102 determines whether the reader/writer 111 storing the information to be deleted is active (S701).

After determining that the reader/writer 111 is active (S701), the controller 102 transmits a command (erasing instruction or erasing command) to erase secret information to the reader/writer 111 (S703).

The reader/writer 111 receives the erasing command and erases all of the secret information stored in the storing area of the storage unit 319 according to the command (S704). The secret information to be erased includes at least one of dedicated permission keys, synthetic keys, and key change package information. However, the present invention is not limited to this example. For example, instructions can be provided to the reader/writer 111 so that all synthetic keys having a service name "A" among secret information are erased.

After the reader/writer 111 has erased the secret information (S704), the reader/writer 111 transmits a response indicating that the erasing process has completed to the controller 102 (S705). Accordingly, the process of erasing the secret information according to the first embodiment completes.

The description about the radio communication system 100 according to the first embodiment ends now. Finally, the advantages of the radio communication system 100 are described below.

(1) Since the reader/writer 111 manages access keys (synthetic keys) or information about the keys such as key change information (key change package information), the processing load can be shared by the reader/writer 111 and the controller 102 and thus the processing load put on the controller 102 reduces. Accordingly, communication with the noncontact IC card 201 can be swiftly performed even if the number of services or access keys increases.

(2) The reader/writer 111 collectively manages (stores, changes, or erases) access keys (synthetic keys) or information about the keys such as key change information (key change package information), so that the range where security must be ensured can be minimized.

(3) Access keys (synthetic keys) or information about the keys such as key change information (key change package information) can be specified on the basis of associated information whose amount is smaller than that of storage addresses. Therefore, a specifying process can be simplified and the storing area can be efficiently used.

Second Embodiment: A Plurality of Readers/Writers 111

Figure 8:
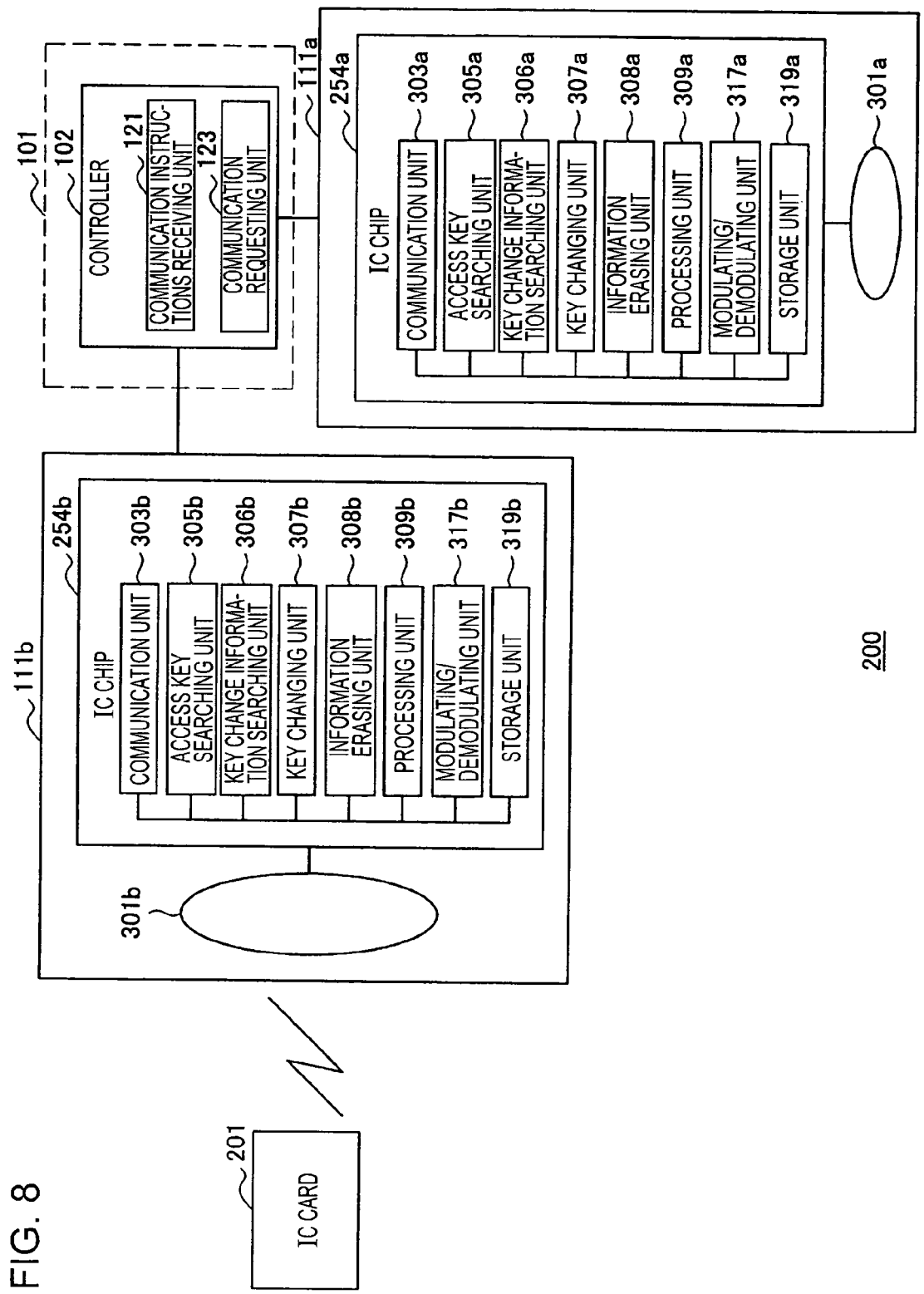
FIG. 8 is a block diagram showing the configuration of a radio communication system according to a second embodiment.

Hereinafter, a radio communication system 200 according to a second embodiment is described with reference to FIG. 8. FIG. 8 is a block diagram showing the configuration of the radio communication system 200 according to the second embodiment.

The radio communication system 200 according to the second embodiment is described below. The description about almost the same part as that of the radio communication system 100 according to the first embodiment is not repeated, but only a different part is described in detail.

As shown in FIG. 8, the radio communication system 200 includes at least the information processing apparatus 101, a reader/writer 111a, a reader/writer 111b, and the noncontact IC card 201. The radio communication system 200 is different from the radio communication system 100 according to the first embodiment in that a plurality of readers/writers 111 are provided. As will be described below, the plurality of readers/writers 111 have different command systems.

As in the radio communication system 200 shown in FIG. 8, more readers/writers 111 become necessary as the types of services (applications) increases and as the command systems used in communication between the readers/writers 111 and the noncontact IC card 201 increases.

On the other hand, a noncontact IC card 201 compatible with a plurality of services has been developed. In the noncontact IC card 201 compatible with a plurality of services, data are stored in storing areas for the respective services. If the noncontact IC card 201 is held over a reader/writer 111 corresponding to a service to be used, the noncontact IC card 201 can communicate with the reader/writer 111 corresponding to the service, for example, can perform settlement.

However, when a plurality of services are used at the same time, for example, a service of making a payment for goods and a service of giving points according to the purchased amount are performed at the same time, the user may have to put the noncontact IC card 201 over two readers/writers 111, because the command systems of the readers/writers 111 are different from each other although the noncontact IC card 201 is compatible with the plurality of services.

In the radio communication system 200 according to the second embodiment, processes for a plurality of services can be performed at one time by putting the noncontact IC card 201 over one reader/writer 111 even if a plurality of readers/writers 111 are provided. In other words, even if the communication partner of the noncontact IC card 201 is a reader/writer 111 having a different command system (ineligible reader/writer), communication can be appropriately performed.

Figure 9:
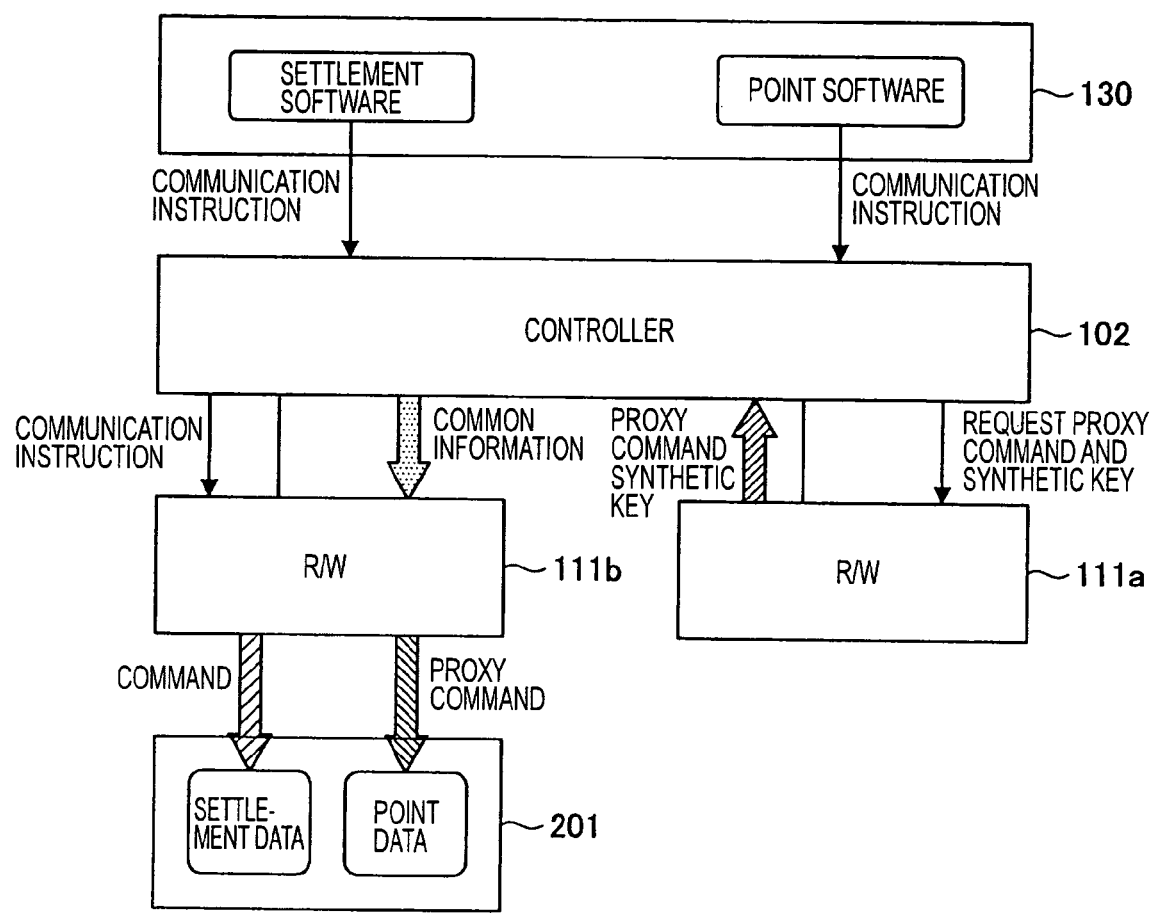
FIG. 9 illustrates a communication process performed in the radio communication system according to the second embodiment.

Now, communication between the ineligible reader/writer 111 and the noncontact IC card 201 according to the second embodiment is described with reference to FIG. 9. FIG. 9 schematically illustrates a communication process performed in the radio communication system 200 according to the second embodiment.

As shown in FIG. 9, data of two types of services: settlement data and point data, are stored in a storing area of a storage unit (not shown) of the noncontact IC card 201. When the settlement data is to be changed or erased, communication instructions are provided from a settlement software as an upper application 130 to the controller 102.

Then, the controller 102 provides communication instructions to update the settlement data in the noncontact IC card 201 to the reader/writer 111b. Accordingly, the reader/writer 111b generates a command in accordance with the communication instructions and transmits the command to the noncontact IC card 201, so that the settlement data can be updated.

On the other hand, in a case where the controller 102 receives communication instructions from a point software and changes or updates the point data, if the noncontact IC card 201 is held over the reader/writer 111b, the controller 102 determines that the reader/writer 111b cannot directly communicate with the noncontact IC card 201 in order to execute the instructions from the point software. Incidentally, the controller 102 makes determination through a polling process that is performed first between the noncontact IC card 201 and the reader/writer 111b.

In this case, the controller 102 requests generating a proxy command to the reader/writer 111a (eligible reader/writer) having a command system compatible with the process of the point data. The proxy command enables the ineligible reader/writer 111b to normally communicate with the noncontact IC card 201.

The reader/writer 111a transmits a proxy command adapted to the instructions from the controller 102 and a synthetic key accessible to the point data in the noncontact IC card 201 to the controller 102. The transmitted data is encrypted in-order-to prevent tapping and the like.

Then, the controller 102 generates common information including the proxy command and the synthetic key and transmits the common information to the reader/writer 111b. The transmitted data except the header of the common information may be encrypted by a key such that the reader/writer 111b can decrypt it. The controller 102 may attach an address, such as a MAC address, of the reader/writer 111b to the header of the common information so that only the reader/writer 111b can receive the common information. Alternatively, the common information may be transmitted to all of the readers/writers 111 connected to the controller 102 so that only a reader/writer 111 that can decrypt the common information can communicate with the noncontact IC card 201.

The reader/writer 111b decrypts the common information transmitted from the controller 102 and transmits the proxy command to the noncontact IC card 201 by using the synthetic key. Accordingly, the reader/writer 111b can update the point data on behalf of the reader/writer 111a. The communication protocol of the reader/writer 111b and the communication protocol of the reader/writer 111a are resolved by software or the like so that both of the readers/writers 111a and 111b can use them.

Now, a series of steps performed in the radio communication system 200 according to the second embodiment is described with reference to FIG. 10. FIG. 10 is a sequence diagram showing a process performed in the radio communication system 200 according to the second embodiment.

As shown in FIG. 10, under a condition where the noncontact IC card 201 and the reader/writer (ineligible reader/writer) 111b recognize each other through mutual authentication, if the controller 102 receives instructions to cause communication between the reader/writer 111a and the noncontact IC card 201 from the upper application, the controller 102 determines whether the reader/writer (eligible reader/writer) 111a is active (S901).

Then, the controller 102 and the reader/writer 111a authenticate each other (S903). After the mutual authentication (S903), the controller 102 transmits a command to generate a proxy command (cooperation command) to the reader/writer 111a (S905).

The reader/writer 111a encrypts and transmits a proxy command adapted to the instructions from the controller 102 and a synthetic key that enables processing the data (data corresponding to a service, e.g., the point data shown in FIG. 9) stored in the noncontact IC card 201 as a communication partner (S907).

Then, the controller 102 receives the synthetic key and the proxy command from the reader/writer 111a, generates common information including the synthetic key and the proxy command, and transmits the common information to the reader/writer 111b after encrypting it (S909). The common information includes data required to execute the proxy command (e.g., settlement amount or points to be added).

The reader/writer 111b receives the common information from the controller 102, decrypts it, extracts the synthetic key and the proxy command included in the common information, encrypts the proxy command by using the synthetic key, and then transmits the proxy command to the noncontact IC card 201 (S911). By transmitting the proxy command, the reader/writer 111b, which is an ineligible reader/writer, can update the data that is stored in the noncontact IC card 201 and that corresponds to the service performed by the reader/writer 111a, on behalf of the reader/writer 111a.

The noncontact IC card 201 receives and decrypts the data transmitted from the reader/writer 111b so as to obtain the proxy command, executes the proxy command, and transmits a response indicating the execution result to the reader/writer 111b (S913).

The reader/writer 111b receives the response from the noncontact IC card 201 and transmits the response to the controller 102 (S915). Further, the controller 102 transmits the response to the reader/writer 111a (S917). The response transmitted in the respective steps (S913 to S917) is adequately encrypted. Therefore, only the reader/writer 111a as the final destination can recognize the content of the response.

The reader/writer 111a receives the response, decrypts it, and transmits the content of the response to the controller 102 (S919). The controller 102 receives instructions from the upper application as necessary and determines a process to be executed next in accordance with the received response. Then, steps S901 to S919 are repeated. In this way, the process in the radio communication system 200 according to the second embodiment ends.

The description about the radio communication system 200 according to the second embodiment ends now. Finally, the advantages of the radio communication system 200 are described below.

(1) The existing reader/writer 111 can be used as it is and a new reader/writer need not be provided. Accordingly, the cost does not increase and a load on a user can be alleviated. Further, processes for a plurality of services can be quickly and efficiently performed at the same time through only one reader/writer 111.

(2) Since the existing reader/writer can be used as it is, the independency of hardware in the radio communication system can be enhanced. Therefore, when the system is to be expanded, the existing hardware can be left as it is and the other part can be efficiently developed. This enables a reduction in the development cost or the like.

(3) The security level can be set/adjusted in each communication or service adaptable to each reader/writer 111. Therefore, a demand from each service provider can be flexibly accepted.

The above-described series of processes can be executed by dedicated hardware or software. When the series of processes are executed by software, the program constituting the software is installed into a multi-purpose computer, a microcomputer, or the like.

In this specification, processing steps describing the program that allows a computer to execute various processes need not always be performed in time series in accordance with the order described in the flowchart or sequence diagram, but may be performed in parallel or individually (e.g., a parallel process or a process by an object).

The embodiments of the present invention have been described with reference to the attached drawings. However, the present invention is not limited to the above-described embodiments. It should be understood by those skilled in the art that various modifications, combinations, sub-combinations and alterations may occur depending on design requirements and other factors insofar as they are within the scope of the appended claims or the equivalents thereof.

In the above-described embodiments, a noncontact IC card is provided in the radio communication system. However, the present invention is not limited to the noncontact IC card but any radio communication apparatus can be used. For example, a PDA (personal digital assistant) capable of performing radio communication can be used in the radio communication system.

The communication performed in the radio communication system according to the above-described embodiments is radio communication. However, the present invention is not limited to radio communication, but the present invention can also be applied to wired communication or to communication in which wired and wireless methods are combined.

What is claimed is:

1. A reader/writer apparatus to communicate with an external radio communication apparatus in accordance with instructions from a controller apparatus, the reader/writer apparatus comprising:

a storage unit including one or more key storing segments to store access keys that enable communication with the radio communication apparatus, wherein the storage unit includes one or more change information storing segments to store key change information used to change the access keys;

an access key searching unit configured to search for an access key stored in one of the key storing segments on the basis of key-associated information that is received from the controller apparatus and that uniquely specify the access key;

a communication unit configured to receive instructions from the controller apparatus, generate a command corresponding to the instructions, and transmit the command to the radio communication apparatus by using the access key obtained by the access key searching unit; and a key change information searching unit configured to search for key change information on the basis of key-change-associated information that is received from the controller apparatus and that uniquely specify the key change information stored in one of the change information storing segments.

2. The reader/writer apparatus according to claim 1, wherein the key-associated information includes at least one of the name of the key storing segment where the access key is stored, the version of the access key, and the name of the access key.

3. The reader/writer apparatus according to claim 2, wherein the key-change-associated information includes at least one of the name of the change information storing segment where the key change information is stored, the version of the key change information, and the name of the key change information.

4. The reader/writer apparatus according to claim 1, wherein the key-change-associated information includes at least one of the name of the change information storing segment where the key change information is stored, the version of the key change information, and the name of the key change information.

5. The reader/writer apparatus according to claim 1, wherein the radio communication apparatus is a noncontact IC card.

6. A reader/writer apparatus to communicate with an external radio communication apparatus in accordance with instructions from a controller apparatus, the reader/writer apparatus comprising:
- a storage unit including one or more key storing segments to store access keys that enable communication with the radio communication apparatus, wherein the storage unit includes one or more change information storing segments to store key change information used to change the access keys;
- an access key searching unit configured to search for an access key stored in one of the key storing segments on the basis of key-associated information that is received from the controller apparatus and that uniquely specify the access key; and
- a communication unit configured to receive instructions from the controller apparatus, generate a command corresponding to the instructions, and transmit the command to the radio communication apparatus by using the access key obtained by the access key searching unit,
- wherein one or more types of instructions transmitted from the controller apparatus include an erasing instruction to erase all of the access keys and/or the key change information held in the reader/writer apparatus, and
- wherein the reader/writer apparatus includes an information erasing unit configured to erase the information stored in the key storing segments and/or the change information storing segments of the storage unit in accordance with the erasing instruction received from the controller apparatus.

7. The reader/writer apparatus according to claim 6, wherein the key-associated information includes at least one of the name of the key storing segment where the access key is stored, the version of the access key, and the name of the access key.

8. A radio communication system comprising:
- a plurality of radio communication apparatuses;
- a plurality of reader/writer apparatuses to communicate with the radio communication apparatuses; and
- a controller apparatus to control a communication process performed by the reader/writer apparatuses,
- wherein the controller apparatus includes
  - a communication instructions receiving unit configured to at least receive instructions about communication between the radio communication apparatuses and the reader/writer apparatuses; and
  - a communication requesting unit configured to request the reader/writer apparatuses to perform communication in accordance with the instructions received by the communication instructions receiving unit,
- wherein each of the reader/writer apparatuses includes
  - a storage unit including one or more key storing segments to store access keys that enable communication with the radio communication apparatus as a communication partner;
  - an access key searching unit configured to search for an access key stored in one of the key storing segments on the basis of key-associated information that is included in instructions received from the controller apparatus and that uniquely specify the access key; and
  - a communication unit configured to receive instructions from the controller apparatus, generate a command corresponding to the instructions in order to communicate with the radio communication apparatus, and transmit the command to the radio communication apparatus by using the access key obtained by the access key searching unit,
- wherein the communication instructions receiving unit receives instructions to perform communication between at least one radio communication apparatus selected from among the plurality of radio communication apparatuses and an eligible reader/writer apparatus configured for communicating with the selected radio communication apparatus,
- wherein, if the selected radio communication apparatus exists in a communication area of an ineligible reader/writer apparatus whose command system is different from that of the selected radio communication apparatus, the communication requesting unit requests the eligible reader/writer apparatus to generate a proxy command corresponding to the received instructions so that the ineligible reader/writer apparatus can perform communication on behalf of the eligible reader/writer apparatus,
- wherein the communication unit provided in the eligible reader/writer apparatus generates a command adapted to the command system of the eligible reader/writer apparatus as the proxy command in response to the request from the communication requesting unit,
- wherein the access key searching unit provided in the eligible reader/writer apparatus searches for an access key on the basis of the key-associated information included in the request from the communication requesting unit,
- wherein the controller apparatus generates common information including the access key obtained by the eligible reader/writer apparatus and the proxy command and transmits the common information to the ineligible reader/writer apparatus, and
- wherein the ineligible reader/writer apparatus receives the common information, extracts the proxy command and the access key included in the common information, and transmits the proxy command to the selected radio communication apparatus by using the access key on behalf of the eligible reader/writer apparatus.

9. The radio communication system according to claim 8, wherein an encrypted response from the selected radio communication apparatus as a communication partner is transmitted to the eligible reader/writer apparatus via the ineligible reader/writer apparatus and the controller apparatus and is decrypted by the eligible reader/writer apparatus.

10. A key managing method for a reader/writer apparatus communicating with an external radio communication apparatus in accordance with instructions from a controller apparatus, the key managing method comprising the steps of:
- searching for an access key among access keys that are stored in one or more key storing segments of a storage unit and that enable communication with the radio communication apparatus on the basis of key-associated information that is received from the controller apparatus and that uniquely specify the access key, wherein the storage unit includes one or more change information storing segments to store key change information used to change the access keys;
- receiving instructions from the controller apparatus, generating a command corresponding to the instructions, and transmitting the command to the radio communication apparatus by using the access key obtained in the access key searching step; and
- searching for key change information on the basis of key-change-associated information that is received from the controller apparatus and that uniquely specify the key change information stored in one of the change information storing segments.

11. A computer program product for allowing a computer to function as a reader/writer apparatus communicating with an external radio communication apparatus in accordance with instructions from a controller apparatus, the computer program product stored on computer readable media and comprising:

access key searching means for searching for an access key among access keys that are stored in one or more key storing segments of a storage unit and that enable communication with the radio communication apparatus on the basis of key-associated information that is received from the controller apparatus and that uniquely specify the access key, wherein the storage unit includes one or more change information storing segments to store key change information used to change access keys;

transmission means for receiving instructions from the controller apparatus, generating a command corresponding to the instructions, and transmitting the command to the radio communication apparatus by using the access key obtained by the access key searching means; and searching for key change information on the basis of key-change-associated information that is received from the controller apparatus and that uniquely specify the key change information stored in one of the change information storing segments.

12. A key managing method for a reader/writer apparatus communicating with an external radio communication apparatus in accordance with instructions from a controller apparatus, the key managing method comprising the steps of:

searching for an access key among access keys that are stored in one or more key storing segments of a storage unit and that enable communication with the radio communication apparatus on the basis of key-associated information that is received from the controller apparatus and that uniquely specify the access key, wherein the storage unit includes one or more change information storing segments to store key change information used to change the access keys; and receiving instructions from the controller apparatus, generating a command corresponding to the instructions, and transmitting the command to the radio communication apparatus by using the access key obtained in the access key searching step, wherein one or more types of instructions transmitted from the controller apparatus include an erasing instruction to erase all of the access keys and/or the key change information held in the reader/writer apparatus, and wherein the reader/writer apparatus includes an information erasing unit configured to erase the information stored in the key storing segments and/or the change information storing segments of the storage unit in accordance with the erasing instruction received from the controller apparatus.

13. A computer program product for allowing a computer to function as a reader/writer apparatus communicating with an external radio communication apparatus in accordance with instructions from a controller apparatus, the computer program product stored on computer readable media and comprising:

access key searching means for searching for an access key among access keys that are stored in one or more key storing segments of a storage unit and that enable communication with the radio communication apparatus on the basis of key-associated information that is received from the controller apparatus and that uniquely specify the access key, wherein the storage unit includes one or more change information storing segments to store key change information used to change the access keys; and transmission means for receiving instructions from the controller apparatus, generating a command corresponding to the instructions, and transmitting the command to the radio communication apparatus by using the access key obtained by the access key searching means, wherein one or more types of instructions transmitted from the controller apparatus include an erasing instruction to erase all of the access keys and/or the key change information held in the reader/writer apparatus, and wherein the reader/writer apparatus includes an information erasing unit configured to erase the information stored in the key storing segments and/or the change information storing segments of the storage unit in accordance with the erasing instruction received from the controller apparatus.

\* \* \* \* \*